United States Patent [19]
Girotti et al.

[11] 3,884,988
[45] May 20, 1975

[54] PRODUCTION OF SYNTHETIC LUBRICANTS FROM ALPHA-OLEFINS THROUGH A TERNARY CATALYTIC SYSTEM

[75] Inventors: Pierleone Girotti; Renato Tesei; Telemaco Floris, all of San Donato Milanese, Italy

[73] Assignee: Snamprogetti S.p.A., San Donato Milanese, Italy

[22] Filed: Feb. 15, 1973

[21] Appl. No.: 332,627

[30] Foreign Application Priority Data
Feb. 15, 1972 Italy .................................. 20564/72

[52] U.S. Cl. ...... 260/683.15 D; 252/59; 252/431 N; 260/683.9
[51] Int. Cl. ............................................. C07c 3/10
[58] Field of Search .. 260/683.15 D; 252/59, 431 N

[56] References Cited
UNITED STATES PATENTS

| | | | |
|---|---|---|---|
| 3,156,736 | 11/1964 | Southern et al. | 260/683.15 D |
| 3,259,668 | 7/1966 | Antonsen | 260/683.15 D |
| 3,467,639 | 9/1969 | Marconi et al. | 252/429 A |
| 3,489,736 | 1/1970 | Takahashi et al. | 252/431 N |
| 3,798,284 | 3/1974 | Tesei et al. | 260/683.15 D |

*Primary Examiner*—Paul M. Coughlan, Jr.
*Attorney, Agent, or Firm*—Ralph M. Watson

[57] ABSTRACT

Synthetic, high quality lubricating oils are produced through the polymerization of a single alpha-olefin or a mixture of alpha-olefins from "wax-cracking" having the formula $R — CH = CH_2$ wherein R is an alkyl radical containing from 2 to 16 C atoms, by the use, in a dry nitrogen atmosphere, of a catalyst system constituted by a compound of a transition metal selected from groups IV to VIII of the periodic system (e.g., $TiCl_4$) and by two coordinate anionic cocatalysts, one of which is an aluminum compound of inorganic nature devoid of any metal-carbon bond and consisting of a polyiminic linear polymer (e.g., a polyimine alane represented by the formula:

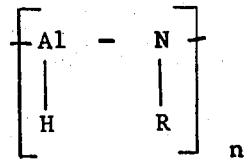

wherein R is alkyl, aryl or cycloalkyl and *n* is a whole number from 4 to 25) and the other of which is an aluminum compound of the conventional Ziegler type with a metal-carbon link (e.g., an aluminum alkyl sesquichloride or an aluminum dialkyl monochloride.

8 Claims, No Drawings

PRODUCTION OF SYNTHETIC LUBRICANTS FROM ALPHA-OLEFINS THROUGH A TERNARY CATALYTIC SYSTEM

The present invention relates to the production of synthetic lubricating oils through polymerization of single pure alpha-olefins or of commercial mixtures of alpha-olefins coming from "wax cracking" with a catalytic system consisting of a catalyst and of two co-catalysts.

The catalytic systems to which we refer in the present invention comprise three components one of said components being a halide of a transition metal. Generally in such catalytic systems the compounds of the transition metals are named "catalysts" and the remaining components are named "cocatalysts" even if it is understood that the effect of these systems depends on the interaction of all the components and that no distinction can be made about the function of each component, and it is settled that the term "cocatalyst" is used for the purpose of a better understanding in the specification and in the claims of the text itself.

It is well known that in mineral lubricating oils, to increase the viscosity index the so named "improvers" of the viscosity index are employed, which are polymers having a very high molecular weight; however during the running of the motor they depolymerize and consequently the oils containing them are made worse with respect to both the viscosity and the viscosity index.

That disadvantage has been overcome by using synthetic lubricating oils, which possess themselves the characteristic of a high viscosity index, which does not decrease during use even after a long period of running. The production of such synthetic oils has been carried out mainly by polymerizing the alpha-olefins. In the beginning both cationic catalysts of the $AlCl_3$ type and catalysts of the type of the alkyl peroxides such as di-tert-butyl peroxide were used. But in this way, people obtained oils with viscosity indices relatively high, namely with viscosity indices of 120–125.

On the other hand, with catalysts of the coordinate anionic type, namely of the Ziegler type, for instance $AlEt_3$ and its derivatives, lubricants were obtained having viscosity indices higher than 130. Such catalysts have the disadvantage, however, of originating lubricating oils with relatively low viscosity.

To eliminate this inconvenience expedients have been resorted to, such as the one described in the U.S. Pat. No. 3,113,167 according to which the lubricating oil is produced in two stages, in the first of which there is employed a ratio of the catalyst components which makes possible obtaining solid polymers and in a second stage, by varying the above mentioned ratio, liquid polymers are obtained, which dissolve the first ones, and in this way it is possible to obtain oils of the desired viscosity. It is obvious however that this manner of proceding is very complex.

A further not negligible disadvantage of the mentioned catalysts is represented by the time required by the polymerization which ranges from 8 to 20 hours, usually 16–23 hours.

Now is has been found that synthetic oils of a high viscosity index and suitable viscosity may be prepared, without the mentioned disadvantages through the process of this invention, consisting in a polymerization either of pure normal-alpha-olefins or of commercial mixtures of alpha-olefins coming from the wax cracking and having the general formula $R—CH = CH_2$, where R is an alkyl radical containing 2–16 carbon atoms. Said polymerization is effected by means of a catalytic system, consisting of a catalyst comprising a compound of a transition metal from the IV to the VIII group of the periodic system and of two coordinated anionic co-catalysts, one of the two cocatalysts being an aluminum compound of inorganic nature, namely utterly devoid of a metal-carbon link, the other one being an aluminium compound of the conventional Ziegler type with metal-carbon link. The co-catalyst of inorganic nature consists of a polyiminic linear polymer (polyimine alane or PIA) having the formula:

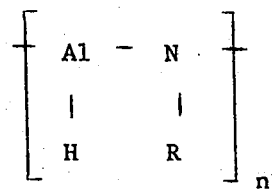

where $n$ is a whole number not higher than 50, preferably in the range from 4 to 25 and R is an alkyl aryl or cycloalkyl radical. Said cocatalyst is the same as the one employed in the process of the Italian patent application No. 26,427 A/69 of Dec. 13, 1969; the cocatalyst of the Ziegler type may be an aluminum alkyl sesquichloride ($AlR_{1.5} Cl_{1.5}$) or an aluminum dialkyl monochloride ($AlR_2Cl$) or aluminum monoalkyl dichloride ($Al R Cl_2$). The addition of this second cocatalyst to the polyiminic compound

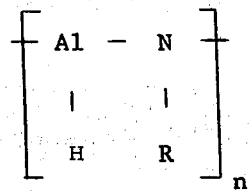

permits obtaining polymers which are comprised, as to viscosity, in the field of the lubricating oils without using hydrogen in the role of controller and regulator of the polymerization according to the method of the above Italian Patent application where however different feeds were used, namely by operating in a nitrogen atmosphere; this occurs with all the types of olefins, both in the case in which they are pure alpha-olefins (for instance 1-decene) and when they are commercial alpha-olefins (for instance $C_9$–$C_{10}$) coming from wax cracking.

Through the process of this invention the use of hydrogen is not required and moreover the monomer 1-decene which does not take part in the reaction does not undergo any hydrogenation and it is susceptible of further polymerization.

The two co-catalysts, namely the PIA (polimine alane) and the compound containing the metal-carbon bond, which reduce the compound of the transition metal, are in a molar ratio which ranges from 60/40 to 90/10 according to the boiling range and to the purity of the alpha-olefins of the feed. Preferably the ratios 70/30 and 80/20 are used. Also the ratio, through which the catalytic complex between PIA and the transition metal compound is formed, must be well defined; it may vary from 1.1 to 1.7 being employed preferably in ratios from 1.2 to 1.3. By varying suitably the two above-mentioned molar ratios, it is possible to obtain lubricating oils over a wide range of viscosity, from 10 cSt to 30 cSt, and also more at 210°F.

As to the molar ratio between the compound containing the metal-carbon bond and the compound of the transition metal, the value 1 has been fixed. As compound of the transition metal $TiCl_4$ is preferably employed, it being possible to employ $TiCl_3$ or the compounds of vanadium as $VCl_4$, $VOCl_3$, a.s.o.

As noted above the process of the present invention is particularly applicable to the single pure alpha-olefins or to their mixtures, obtained from the wax cracking of the paraffin, for instance in the range from $C_4$ to $C_6$, from $C_6$ to $C_8$, from $C_7$ to $C_9$, from $C_8$ to $C_{10}$ up to $C_{16}$–$C_{18}$ namely the normal industrial production olefins.

The polymerization reaction is effected preferably by permitting the catalyst to form "in situ" namely in the same olefins; in these conditions it is possible to operate in the absence or in the presence of a solvent and in the last case oils are obtained which present, with respect to the ones obtained in the absence of solvents, lower viscosities.

By operating on the contrary with the catalyst "preformed" in the solvent, yields of oils which are remarkably lower are obtained.

The hydrocarbons which may be used as solvents are the conventional organic solvents: the aromatics such as benzene, toluene, xylene, and their derivatives; halogenated hydrocarbons, such as chlorobenzene fluorobenzene and so on; the saturated hydrocarbons such as pentanes, hexanes, heptanes, octanes, decanes and the cycloparaffins such as cyclo hexane, methyl cyclohexane and so on.

Also mixtures of the said hydrocarbons may be used. Generally, the selection of the solvent is made by bearing in mind that it must have a boiling point such that the feed olefins and the obtained polymers are easily separable by distillation.

The amount of solvent may reach a volume which may be up to 10 times that of the olefins.

The temperature of polymerization in the process in question ranges from 0° to 200°C, preferably between 15° and 80°C. The effect of the temperature is different according to the use of a pure single alpha-olefin or of mixtures of alpha-olefins coming from the wax-cracking. With the first ones by increasing the temperature a minor yield of oil is obtained, and the viscosity is higher. The second ones present differences which, by varying the temperature, are less remarkable.

The ratio by weight olefin/compound of the transition metal, employed in the process of this invention may be in the range between 5 and 500, preferably between 50 and 150. Such a ratio varies according to the boiling range and to the purity of the feed alpha-olefins. The reaction time may reach up to 5 hours. By using the catalytic system of the invention the reaction vessels after being thoroughly cleaned and dried must be flushed with an inert dried gas, for instance, with nitrogen.

The feed alpha-olefins must be subjected to deaeration and to dehydration and/or to a pretreating of purification which may be carried out in different ways: with the some exhaust catalyst, with anhydrous $TiCl_4$, with anhydrous $AlCl_3$, with $FeSO_4$ and $H_2SO_4$, through percolation on silica and/or molecular sieves and so on. Then the olefins are maintained, after deaeration and final dehydration in an atmosphere of dry nitrogen.

The compositions of the alpha olefins used as feed in the present invention are the following:

A) 1-decene
| | |
|---|---|
| Content in the linear alpha-olefins | 97% by wt. |
| Specific gravity at 20°C | 0.741 |
| Refraction Index $n_D^{20}$ | 1.4232 |
| Bromine number g/100 g | 114 |

B) Mixture of commerical alpha-olefins $C_9$–$C_{10}$ from wax cracking
| | |
|---|---|
| Content of linear alpha-olefins, % b.w. | 87 |
| Distribution of $C_9$ carbon atom | 55% |
| Distribution of $C_{10}$ carbon atom | 45% |
| Specific gravity at 20°C | 0.742 |
| Refraction index, $n_D^{20}$ | 1.4240 |
| Molecular weight | 132 |
| Bromine number, gr/100 g | 120 |

Also, the solvents which are employed must be deaerated, dehydrated and maintained in an atmosphere of dry nitrogen. Similarly to the feed olefins and to the solvents, all the components of the catalytic system are maintained in a dry nitrogen atmosphere. The oil produced through the process of this invention is not saturated, containing about a double bond "per molecule"; it is then subjected to a hydrogenation with a conventional catalyst containing Pd or Pt or Ni or CoMo, in order to remove the residual unsaturation. Hereinafter as examples and not as limitations some illustrations of the present invention are reported.

EXAMPLE I

In a 1 l reactor, provided with a stirrer and a jacket for liquid circulation, accurately dried and deaerated and flushed with dry nitrogen, there were introduced in the following order 350 cc(259g) of 97% 1-decene, 6.80 cc of a 2.23 molar solution of $TiCl_4$, 5.30 cc of a 0.84 molar solution of $Et_{1.5}Cl_{1.5}$ and 13.80 cc of a 1 molar solution of poly (N-isopropyl imine alane).

The ratio by weight olefine/$TiCl_4$ was 90. The reduction of $TiCl_4$ was ascribed as 70% to the polyimine alane (with a molar ratio Al/Ti = 1.3) and 30% to ethyl aluminum sesquichloride (with a molar ratio Al/Ti = 1.0). Then we stirred at 25°C temperature for 5 hours.

At the end the catalyst was deactivated by adding isopropyl alcohol and then the oily phase was washed with diluted HCl and subsequently with water till neutralization was complete.

After separating the water phase the oily phase was distilled at atmospheric pressure to remove the olefin, which did not react and subsequently the distillation was carried out at reduced pressure.

By cutting at a top temperature, under atmospheric pressure, of 400°C, 44 g of dimer and 176 g of oil were obtained, the oil having the boiling point higher than 400°C (400°C+).

The total conversion with reference to the fed olefins was of 84.9% b.w. and the yield in oil was of 68% b.w.

TABLE 1

| Characteristics | Method | 400°C + oil |
|---|---|---|
| Specific gravity at 20°C | ASTM D 1481 | 0.8337 |
| Refraction Index, $n_D^{20}$ | ASTM D 1747 | 1.4678 |
| Kinematic viscosity at 210°F, cSt | ASTM D 445 | 19.14 |

TABLE 1 — Continued

| Characteristics | Method | 400°C + oil |
| --- | --- | --- |
| Kinematic viscosity at 100°F, cSt | ASTM D 445 | 121.7 |
| Viscosity Index | ASTM D 2270 | 140/A − 188/B |
| Pouring point, °C | ASTM D 97 | < − 50 |
| Ramsbottom carbon residue, % b.w. | ASTM D 524 | 0.03 |
| Neutralization point, mg KOH/g | ASTM D 974 | <0.04 |
| Iodine number g/100 g | I.P. 48 | 40 |
| Molecular weight | vapor pressure osmometer | 650 |

It is to be noted that the monomer which does not react, undergoes practically no hydrogenation and may be polymerized further.

The 400°C+ oil was subsequently hydrogenated to saturate completely the olefin double bonds.

The hydrogenation was effected in an autoclave by using a catalyst based on Pd on alumina under the following conditions: temperature 220°C, hydrogen pressure 80 Kg/cm$^2$, time 5 hours. The characteristics of the hydrogenated oil are shown in Table II.

TABLE II

| Characteristics | Method | A 400°C + hydrogenated oil |
| --- | --- | --- |
| Specific gravity | ASTM D 1481 | 0.8323 |
| Refraction Index, $n_D^{20}$ | ASTM D 1747 | 1.4664 |
| Kinematic viscosity at 210°F, cSt | ASTM D 445 | 19.94 |
| Kinematic viscosity at 100°F, cSt | ASTM D 445 | 130.0 |
| Viscosity Index | ASTM D 2270 | 139/A − 186/B |
| Pour point, °C | ASTM D 97 | <−50 |
| Ramsbottom carbon residue % b.w. | ASTM D 524 | 0.03 |
| Neutralization mg KOH/g | ASTM D 974 | 0.04 |
| Iodine number, g/100 g | I.P. 48 | 0.3 |
| Molecular weight | V. pressure osmometre | 670 |

EXAMPLE 2

Into a 1 liter reactor, provided with a stirrer, dried, deaerated, flushed with dry nitrogen we introduced in the following order, 350 cc (259 g) of 97% 1-decene, 6.80 cc of a 2.23 molar solution of TiCl$_4$, 5.40 cc of a 0.84 molar solution of AlEt$_{1.5}$Cl$_{1.5}$ and 11.65 cc of a 1 molar solution of poly-(N-isopropylimino alane).

The ratio b.w. of olefins/TiCl$_4$ was 90. The reduction of TiCl$_4$ was 70% due to the polyiminoalane (having a molar ratio Al/Ti = 1.1) and 30% due to the EtAl sesquichloride (having a Al/Ti ratio = 1.0). Then we stirred at the temperature of 25°C for a time of 5 hours.

After treating the polymerization product as in the Example 1, we obtained 53 g of dimer and 169 g of 400°C + oil. The conversion was 85.7% b.w. and the yield of oil of 65.2% b.w.

The 400°C+ oil characteristics are reported in Table III.

The above results show that by varying the ratio Al/Ti relative to the alane from 1.3 (of the Example 1) to 1.0 we obtained oils with lower viscosity.

EXAMPLE 3

In a 1 liter reactor provided with a stirrer, dried, deaerated and flushed with dry nitrogen we introduced in the following order 350 cc (259 g) of 97% 1-decene, 6.80 cc of a 2.23 molar solution of TiCl$_4$, 5.40 cc of 0.84 molar solution of AlEt$_{1.5}$Cl$_{1.5}$ and 15.90 cc of a 1.0 molar solution of poly(N-isopropyliminoalane).

The ratio b.w. olefines/TiCl$_4$ was 90. The reduction of the TiCl$_4$ was attributed for the 70% to the polyiminoalane (having a molar ratio Al/Ti = 1.5) and for the 30% to the Al ethyl sesquichloride (having a molar ratio Al/Ti = 1.0).

Then we stirred at a temperature of 25°C for a time of 5 hours.

After treating the product of the polymerization as in Example 1, we obtained 50 g of dimer and 173 g of 400°C+ oil. The conversion was of 86.1 b.w. and the yield of oil was 66.8% b.w.

The characteristics of the obtained 400°C+ oil are reported in Table IV.

TABLE IV

| Characteristics | Method | 400°C + oil |
| --- | --- | --- |
| Specific gravity at 20°C | ASTM D 1481 | 0.8345 |
| Refraction Index, $n_D^{20}$ | ASTM D 1747 | 1.4680 |
| Kinematic viscosity at 210°F, cSt | ASTM D 445 | 32.5 |
| Kinematic viscosity at 100°F, cSt | ASTM D 445 | 209.4 |
| Viscosity Index | ASTM D 2270 | 138/A − 220/B |
| Pour point, °C | ASTM D 97 | − 50 |

Said results show that by varying the molar ratio Al/Ti relative to the alane from 1.3 (of the Example 1) to 1.5 we obtained oils with a higher viscosity.

TABLE III

| Characteristics | Method | 400°C + oil |
| --- | --- | --- |
| Specific gravity at 20°C | ASTM D 1481 | 0.8301 |
| Refraction Index, $n_D^{20}$ | ASTM D 1747 | 1.4667 |
| Kinematic viscosity at 210°F, cSt | ASTM D 445 | 10.81 |
| Kinematic viscosity at 100°F, cSt | ASTM D 445 | 62.05 |
| Viscosity Index | ASTM D 2270 | 144/A − 178/B |
| Pour point, °C | ASTM D 97 | <− 50 |

EXAMPLES 4 AND 5

They are similar to Example 1 varying only in the polymerization temperature.

In a 1 liter reactor, provided with a stirrer, dried, de-aerated and flushed with dry nitrogen we introduced in the following order: 350 cc (259 g) of 97% 1-decene, 6.80 cc of a 2.23 molar solution of $TiCl_4$, 5.40 cc of a 0.84 molar solution $AlEt_{1.5}Cl_{1.5}$ and 13,80 cc of 1.0 molar solution of poly-(N-isopropyliminoalane).

As in Example 1, the ratio by weight olefins/$TiCl_4$ was 90 and the reduction of $TiCl_4$ was attributed for the 70% to the polyimino alane (having a molar ratio Al/Ti = 1.3) and for the 30% to the Al ethyl sesquichloride (having a molar ratio = 1.0).

The polymerization temperature was 50°C in example 4 and 80°C in the Example 5. The time was in both cases 5 hours.

The polymerization products were treated as in Example 1. In Example 4 we obtained a conversion of 58% and a yield of oil of 45%.

In Example 5 the conversion was 55% and the yield of oil 39%.

The characteristics of the two 400°C+ oils were reported in the Table V.

TABLE V

| Characteristics | Method | | 400°C + oil example 4 | 400°C + oil example 5 |
| --- | --- | --- | --- | --- |
| Specific gravity at 20°C | ASTM D | 1481 | 0.8352 | 0.8368 |
| Refraction Index, $n_D^{20}$ | ASTM D | 1747 | 1.4682 | 1.4688 |
| Kinematic viscosity at 210°F, cSt | ASTM D | 445 | 76.1 | 159 |
| Kinematic viscosity at 100°F, cSt | ASTM D | 445 | 516 | 1130 |
| Viscosity Index | ASTM D | 2270 | 131/A–238/B | 127/A–267/B |
| Pour Point, °C | ASTM D | 97 | – 45 | – 43 |

The above results show that the increase of the temperature generates oils with minor yield and higher viscosity.

EXAMPLE 6

It is analogous to Example 1 with the only variation the presence of a solvent.

To a 1 liter reactor, provided with a stirrer, dried, de-aerated and flushed with dry nitrogen we introduced in the following order, 350 cc (259 g) of 97% 1-decene and 350 cc of benzene, 6.80 cc of a 2.23 molar solution of $TiCl_4$, 5.40 of a 0.84 molar solution of $AlEt_{1.5}Cl_{1.5}$ and 13.80 cc of a 1.0 molar solution of poly-(N-isopropylimino alane).

As in Example 1, the ratio b.w. olefins/$TiCl_4$ was 90 and the reduction of the $TiCl_4$ was ascribed as 70% to the polyiminoalane (having a molar ratio Al/Ti = 1.3) and for 30% to the Al ethyl sesquichloride (having a molar ratio Al/Ti = 1.0).

Then we stirred at a temperature of 25°C for a time of 5 hours.

After treating the polymerization product as in example 1 we obtained 47 g of dimer and 166 g of oil.

The total conversion with respect to the fed olefins was of the 82.2% b.w. and the oil yield of the 64.1% b.w.

The characteristics of the obtained 400°C+ oil are reported in Table VI.

TABLE VI

| Characteristics | Method | | 400°C + oil |
| --- | --- | --- | --- |
| Specific gravity at 20°C | ASTM D | 1481 | 0.8318 |
| Refraction Index $n_D^{20}$ | ASTM D | 1747 | 1.4674 |
| Kinematic viscosity at 210°F, cSt | ASTM D | 445 | 12.34 |
| Kinematic viscosity at 100°F, cSt | ASTM D | 445 | 71.40 |
| Viscosity Index | ASTM D | 2270 | 144/A–184/B |
| Pour point, °C | ASTM D | 97 | < – 50 |

Upon comparing these results with those of Example 1, we noticed that the addition of the solvent to the olefin of the feed reduces the oil viscosity, leaving the yield nearly unchanged.

EXAMPLE 7

In this example, as in the following ones, we employed as feed, a mixture of $C_9$–$C_{10}$ alpha-olefins from "wax cracking."

To a 1 liter reactor provided with a stirrer, dried, de-aerated and flushed with dry nitrogen, we introduced in the following order: 350 cc (260 g) of a mixture of commercial olefins $C_9$–$C_{10}$ coming from "wax cracking" with a content of alpha-olefins of 87%, 6.80 cc of a 2.23 molar solution of $TiCl_4$, 5.40 cc of 0.84 molar solution of $AlEt_{1.5}Cl_{1.5}$ and 13.80 cc of a 1.0 molar solution of poly-(N-isopropylimino alane).

As in Example 1, the ratio by weight olefins/$TiCl_4$ was 90 and the reduction of $TiCl_4$ was ascribed as 70% to the polyiminoalane (having a molar ratio Al/Ti = 1,3) and 30% to Al Ethyl sesquichloride (having a molar ratio Al/Ti = 1.0).

Then we stirred at a temperature of 25°C for a time of 5 hours.

After treating the polymerization product as in example 1.27 g of dimer and 100 g of 400°C+ oil were obtained. The conversion was 48.8% b.w. and the yield oil of 38.4% b.w.

The characteristics of the 400°C+ oil so obtained were reported in Table VII.

TABLE VII

| Characteristics | Method | | 400°C + oil |
| --- | --- | --- | --- |
| Specific gravity at 20°C | ASTM D | 1481 | 0.8422 |
| Refraction Index, $n_D^{20}$ | ASTM D | 1747 | 1.4705 |

TABLE VII—Continued

| Characteristics | Method | | 400°C + oil |
|---|---|---|---|
| Kinematic viscosity at 210°F, cSt | ASTM D | 445 | 25.31 |
| Kinematic viscosity at 100°F, cSt | ASTM D | 445 | 180.9 |
| Viscosity Index | ASTM D | 2270 | 136/A – 183/B |
| Pour point, °C | ASTM D | 97 | < – 50 |

The above results show that even if we operated with the mixture of commercial $C_9$–$C_{10}$ alpha-olefins from "wax cracking," the obtained oils present good characteristics.

The yields are lower, as compared with those obtained in Example 1 starting from 1-decene, due to the presence of impurities in said mixture.

EXAMPLE 8

It is analogous to example 7 with the only variation the decrease of the ratio by weight olefins/$TiCl_4$ from 90 to 60.

Into a 1 litre reactor, provided with a stirrer dried, deaerated and flushed with dry nitrogen, we introduced, in the following order 350 cc (260 g) of a mixture of commercial $C_9$–$C_{10}$ olefins coming from the "wax cracking," with a content of alpha-olefins of 87%, 10.20 cc of a 2.23 molar solution of $TiCl_4$, 8.10 cc of a 0.84 molar solution of $AlEt_{1.5}Cl_{1.5}$ and 20.70 cc of a 1 molar solution of poly-(N-isopropyliminoalane).

The ratio by weight olefins/$TiCl_4$ was 60. The reduction of the $TiCl_4$ was ascribed as 70% to the polyiminoalane (having a molar ratio Al/Ti = 1.3) and 30% to Al Ethyl sesquichloride (having a molar ratio Al/Ti = 1.0).

Then we stirred at the temperature of 25°C for a time of 5 hours.

After treating the polymerization product as in example 1.39 g of dimer and 135 g of 400°C+ oil were obtained.

The conversion was 67% by weight and the yield of oil of the 52% b.w.

The characteristics of the obtained oil were reported in Table VIII.

TABLE VIII

| Characteristics | Method | | 400°C + oil |
|---|---|---|---|
| Specific gravity at 20°C | ASTM D | 1481 | 0.8420 |
| Refraction Index, $n_D^{20}$ | ASTM D | 1747 | 1.4704 |
| Kinematic viscosity at 210°F, cSt | ASTM D | 445 | 23.59 |
| Kinematic viscosity at 100°F, cSt | ASTM D | 445 | 169.0 |
| Viscosity Index | ASTM D | 2270 | 136/A–179/B |
| Pour point, °C | ASTM D | 97 | < – 50 |

By comparing these results with those of Example 7 we may deduce that, by operating with olefins $C_9$–$C_{10}$ from "wax cracking," effect of the impurities on the yield may be limited by increasing the amount of the catalyst. The characteristics of the oil remain satisfactory.

It is to be noted that the monomer which does not take part in the reaction undergoes practically no hydrogenation.

The 400°C+ oil was hydrogenated to saturate completely the olefinic double bonds.

The hydrogenation was carried out in an autoclave by using a catalyst based on Pd on alumina in the following conditions: temperature 220°C, pressure of hydrogen 80 Kg/cm², time 5 hours. The characteristics of the hydrogenated oil are shown in Table IX.

TABLE IX

| Characteristics | Method | | 400°C + hydrogenated oil |
|---|---|---|---|
| Specific gravity at 20°C | ASTM D | 1481 | 0.8404 |
| Refraction Index, $n_D^{20}$ | ASTM D | 1747 | 1.4690 |
| Kinematic viscosity at 210°F, cSt | ASTM D | 445 | 24.42 |
| Kinematic viscosity at 100°F, cSt | ASTM D | 445 | 176.5 |
| Viscosity Index | ASTM D | 2270 | 135/A–179/B |
| Pour point, °C | ASTM D | 97 | – 48 |

The 400°C+ hydrogenated oil which is shown in table IX was subjected to a Shear Stability test with a Raytheon sonic oscillator (ASTM D 2603-671) for a time of 15 minutes, calculating afterwards the variation of the viscosity, measured at the temperature of 210°F.

The results appear in Table X.

TABLE X

| | Kinematic viscosity, cSt at 210°F | | Kinematic viscosity variation |
|---|---|---|---|
| | starting | after test | |
| Hydrogenated synthetic oil | 24.42 | 23.68 | – 0.74 cSt |

From the above data it is possible to deduce that the hydrogenated synthetic oil of Example 8 has good resistance to depolymerization.

EXAMPLES 9–10

They were carried out as in Example 8, with a ratio by weight olefins/$TiCl_4$ equal to 60 but varying from 70/30 to 80/20 the ratio wherewith the two co-catalysts reduce the $TiCl_4$.

Under these conditions we lowered from 1.3 to 1.2 the ratio wherewith the complex PIA-$TiCl_4$ is formed, otherwise an oil with a high viscosity would be obtained.

To the usual 1 liter reactor, dried, deaerated and flushed with dry nitrogen we introduced in the following order, 350 cc (260 g) of the mixture of $C_9$–$C_{10}$ olefins coming from the "wax cracking" with a content of alpha-olefins of 87%; 10.2 cc of a 2.3 molar solution of $TiCl_4$; 5.4 cc of a 0.84 molar solution of $AlEt_{1.5}Cl_{1.5}$ and 21.8 cc of a 1.0 molar solution of poly-(N-isopropyliminoalane).

The ratio b.w. olefins/$TiCl_4$ was 60.

The reduction of the $TiCl_4$ was ascribed as 80% due to the polyiminealane (having a molar ratio Al/Ti = 1.2) and 20% to the Al Ethyl sesquichloride (having a molar ratio Al/Ti = 1.0).

The polymerization temperature was 25°C in Example 9 and 50°C in Example 10. The time was in both cases 5 hours.

The polymerization products were treated as in Example 1. In Example 9 we obtained a conversion of 83% with a yield of 400°C+ oil of 63.5%.

In Example 10 the conversion was 79% and the yield of 400°C+ oil 60%.

The characteristics of the two obtained 400°C+ oils are reported in Table XI.

using the co-catalyst $AlEt_2Cl$ in place of $AlEt_{1.5}Cl_{1.5}$.

Into a 1 liter reactor provided with a stirrer, dried, deaerated and flushed with dry nitrogen we introduced in the following order: 350 cc (260 g) of a mixture of commercial $C_9$–$C_{10}$ olefins coming from the "wax cracking" with a content of alpha-olefins of 87%, 10.2 cc of a 2.23 molar solution of $TiCl_4$, 4.25 cc of a 1.07 molar solution of $AlEt_2Cl$ and 21.8 cc of a 1.0 molar solution of poly-(N-isopropyliminoalane).

The ratio by weight olefins/$TiCl_4$ was 60.

The reduction of the $TiCl_4$ was ascribed as 80% due to the polyiminoalane (having a molar ratio Al/Ti = 1.2) and 20% to Al diethyl monochloride (having a molar ratio Al/Ti = 1.0).

The polymerization temperature was 25°C. The time was 5 hours. After treating the polymerization product as in Example 1, we obtained 47 g of dimer and 153 g of 400°C+ oil.

The conversion was of the 77% b.w. and the yield of oil 59%.

TABLE XI

| Characteristics | Method | | 400°C + oil of example 9 | 400°C + oil of example 10 |
|---|---|---|---|---|
| Specific gravity at 20°C | ASTM D | 1481 | 0.8428 | 0.8432 |
| Refraction Index, $n_D^{20}$ | ASTM D | 1747 | 1.4708 | 1.4711 |
| Kinematic viscosity at 210°F, cSt | ASTM D | 445 | 29.11 | 36.5 |
| Kinematic viscosity at 100°F, cSt | ASTM D | 445 | 206.5 | 255.2 |
| Viscosity Index | ASTM D | 2270 | 136/A–191/B | 135/A–202/B |
| Pour point, °C | ASTM D | 97 | – 50 | < – 50 |

The results of Example 9 show, in comparison with those of Example 8, that it is possible to increase further the oil yield which is obtained from the commercial olefins (without appreciable variation in the characteristics) by suitably varying both the ratio of the co-catalyst and the ratio PIA/$TiCl_4$.

From Example 10 it is to be noted that the increase of the temperature, when commercial olefins are used has not a sensible influence on the yield and on the viscosity of the produced oil.

EXAMPLE 11

It is similar to Example 9 with the difference that the polymerization of the $C_9$–$C_{10}$ olefins was carried out by The characteristics of the produced oil are reported in the Table XII.

TABLE XII

| Characteristics | Method | | 400°C + Oil |
|---|---|---|---|
| Specific gravity at 20°C | ASTM D | 1481 | 0.8410 |
| Refraction Index, $n_D^{20}$ | ASTM D | 1747 | 1.4698 |
| Kinematic viscosity at 210°F, cSt | ASTM D | 445 | 19.49 |
| Kinematic viscosity at 100°F, cSt | ASTM D | 445 | 135.1 |
| Viscosity Index | ASTM D | 2270 | 136/A – 175/B |
| Pour point, °C | ASTM D | 97 | < – 50 |

The results of the above example show that it is possible to substitute $AlEt_{1.5}Cl_{1.5}$ with $AlEt_2Cl$.

We claim:

1. Process for the preparation of high quality lubricating oils through the polymerization of a member of the group consisting of pure normal alpha-olefins and of mixtures of commercial alpha-olefins having the general formula R — CH = $CH_2$, in which R is an alkyl radical containing from 2 to 16 carbon atoms, wherein the catalytic system used for effecting the polymerization is a catalyst consisting of a compound of a transition metal selected from the group consisting of $TiCl_4$, TiCl$_3$, VCl$_4$ and VOCl$_3$ and two anionic coordinate cocatalysts, consisting, respectively, of: (a) a linear polymer constituted by a polyiminic compound having the following general formula

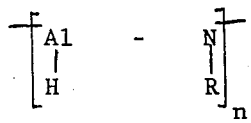

wherein $n$ is a whole number not higher than 50 and R is an alkyl or cycloalkyl radical; and (b) a member of the group consisting of an aluminum alkyl sesquichloride an aluminum dialkyl mono chloride, and an aluminum monoalkyl dichloride the ratio between compound (a) and compound (b) is from 60/40 to 90/10 and the ratio between compound (a) and the transition metal compound is from 1.1 to 1.7.

2. Process according to claim 1 wherein the polymerization is carried out in a dry nitrogen atmosphere.

3. Process according to claim 1, wherein the two cocatalysts which reduce the transition metal compound are in a ratio from 70/30 to 80/20.

4. Process according to claim 1 wherein the molar ratio between compound (a) and the compound of the transition metal is from 1.2 to 1.3, fixing at 1 the molar ratio between compound (b) and the transition metal compound.

5. Process according to claim 1, wherein the transition metal compound is TiCl$_4$.

6. Process according to claim 1, wherein the ratio by weight of olefins/transition metal compound is between 10 and 500.

7. Process according to claim 1, wherein the reaction is carried out in the presence of a solvent selected from the group consisting of aromatic hydrocarbons, halogenated hydrocarbons and saturated hydrocarbons.

8. Process according to claim 1, wherein the polymerization temperature is from 0° to 200°C.

* * * * *

UNITED STATES PATENT AND TRADEMARK OFFICE
CERTIFICATE OF CORRECTION

PATENT NO. : 3,884,988
DATED : May 20, 1975
INVENTOR(S) : Pierleone Girotti, Renato Tesei and Telemaco Floris It is certified that error appears in the above-identified patent and that said Letters Patent are hereby corrected as shown below:

Column 3, line 10, after "metal" insert a comma --,-- line 44, before "olefins" insert --feed--

Column 5, table 2, line 10, "0.04" should read --<0.04--

Column 6, line 37, "for the" should read --as-- line 39, delete "for the"

Column 7, line 9, "13,80" should read --13.80--

Column 8, line 1, delete "for"

Column 13, line 13, before "an" (first occurrence) insert a comma --,--

Signed and Sealed this twenty-third Day of December 1975

[SEAL]

Attest:

RUTH C. MASON
*Attesting Officer*

C. MARSHALL DANN
*Commissioner of Patents and Trademarks*